United States Patent
Rokosz (10) Patent No.: US 7,627,857 B2
(45) Date of Patent: Dec. 1, 2009

(54) SYSTEM AND METHOD FOR VISUALIZING EXCEPTION GENERATION

(75) Inventor: Vaughn Theodore Rokosz, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 10/988,924

(22) Filed: Nov. 15, 2004

(65) Prior Publication Data

US 2006/0112373 A1 May 25, 2006

(51) Int. Cl.
*G06F 9/44* (2006.01)
*G06F 11/00* (2006.01)

(52) U.S. Cl. .................. 717/124; 714/37; 714/45

(58) Field of Classification Search .............. 717/124; 714/37, 45, 46
See application file for complete search history.

(56) References Cited

U.S. PATENT DOCUMENTS

| | | | | |
|---|---|---|---|---|
| 5,881,280 | A | | 3/1999 | Gupta et al. .................. 395/591 |
| 5,901,308 | A | | 5/1999 | Cohn et al. .................. 395/591 |
| 6,205,491 | B1 | | 3/2001 | Callsen et al. ............... 709/315 |
| 6,321,377 | B1 | | 11/2001 | Beadle et al. .................. 717/5 |
| 6,339,832 | B1 | * | 1/2002 | Bowman-Amuah .......... 714/35 |
| 6,477,702 | B1 | * | 11/2002 | Yellin et al. .................. 717/126 |
| 6,513,154 | B1 | | 1/2003 | Porterfield .................... 717/101 |
| 6,553,564 | B1 | | 4/2003 | Alexander et al. ........... 717/128 |
| 6,615,343 | B1 | | 9/2003 | Talcott et al. ............... 712/244 |
| 6,760,903 | B1 | * | 7/2004 | Morshed et al. ............. 717/130 |
| 7,065,633 | B1 | * | 6/2006 | Yates et al. .................. 712/227 |
| 7,086,066 | B2 | * | 8/2006 | Kappel et al. ................ 719/318 |
| 7,120,901 | B2 | * | 10/2006 | Ferri et al. ................... 717/128 |
| 2002/0184614 | A1 | | 12/2002 | Davia et al. ................. 717/127 |
| 2003/0014221 | A1 | | 1/2003 | Bell et al. .................... 702/186 |
| 2003/0018643 | A1 | * | 1/2003 | Mi et al. ....................... 707/10 |
| 2003/0074605 | A1 | * | 4/2003 | Morimoto et al. ............. 714/38 |
| 2003/0149604 | A1 | * | 8/2003 | Casati et al. ................... 705/7 |
| 2004/0250175 | A1 | * | 12/2004 | Draine et al. ................. 714/46 |

OTHER PUBLICATIONS

Csallner, Christoph *Mini Project Report One*. Sep. 29, 2003. www.cc.gatech.edu/~csallnch/papers/csallner03exception.pdf—similar pages.

(Continued)

*Primary Examiner*—Wei Y Zhen
*Assistant Examiner*—Chih-Ching Chow
(74) *Attorney, Agent, or Firm*—Holland & Knight LLP; Brian J Colandreo, Esq.; Seth A. Milman (57) ABSTRACT

A system for animating the visualization of exceptions thrown by an application includes an application server; an application program; an in-memory exception table; an exception log file; an analysis database; and a user interface. The application server is operable for executing the application program during a server session including a plurality of analysis windows; responsive to exceptions thrown by the application program during execution for logging exception data to the in-memory exception table; responsive to completing an analysis window, logging the exception table to the exception log file; responsive to completing the server session, for building an analysis database from the exception log file; and generating from the exception log file an exception visualization animation including a sequential plurality of exception table renditions to the user interface.

21 Claims, 6 Drawing Sheets

CLASS DIAGRAM EXAMPLE

OTHER PUBLICATIONS

Chang, Byeong-Mo, Jang-Wu Jo, and Soon Hee Her. *Visualization of Exception Propagation for Java Using Static Analysis*. Second IEEE International Workshop on Source Code Analysis and Manipulation (SCAM'02) Oct. 1, 2002, Montreal, Canada. http://csdl.computer.org/comp/proceedings/scarn/2002/1793/00/17930173abs.htm. —similar pages.

Barton, John J. and John Whaley. *A Real-Time Performance Visualizer for Java*. Dr. Dobb's Journal Mar. 1998. http://www.ddj.corn/print.

* cited by examiner

IN-MEMORY EXCEPTION TABLE

FIG. 3

ANALYSIS DATABASE

FIG. 4

VISUALIZATION ANIMATION

FIG. 5

CLASS DIAGRAM EXAMPLE

FIG. 6

FIG. 7

SYSTEM AND METHOD FOR VISUALIZING EXCEPTION GENERATION

BACKGROUND OF THE INVENTION

1. Technical Field of the Invention

This invention relates to program debugging. More particularly, it relates to visualizing exception generation.

2. Background Art

Developing and debugging software is difficult, in part because most software code executes invisibly. While there are typically user-visible manifestations of software behavior, such as user interfaces, there is a great deal of processing that goes on behind the scenes that is not visible.

Tools that can help developers to visualize this "behind the scenes" processing can speed up the development process, as well as make it easier to find and fix defects and thereby improve quality.

Many programming languages provide an explicit "exception" construct as a way for code to handle unexpected or atypical conditions. One part of the code will "throw" an exception, while another part of the code (perhaps in a separate code module) will "catch" and "handle" the exception. Both Java and C++, for example, support exceptions (try/catch blocks, and the throw statement).

There are tools available today that make some aspects of program structure and behavior visible to developers. There are tools that perform static analysis of source code, for example, and generate class diagrams from code files. Such tools are limited in that they are not looking at the dynamic, run-time behavior of software but rather at its structure. There are tools that look explicitly at exceptions and how they propagate, but these tools are also based on static analysis of code, and not on run-time behavior.

Software debuggers are another class of tool that supports visualization of software. Debuggers are focused on run-time behavior, and can help to analyze exceptions (e.g., by setting breakpoints near throw or catch statements). Debuggers do not, however, provide tools for the visualization of the history of exceptions. Instead such debuggers focus on a single instance of an exception at a time. In some cases, a limited form of exception history might be maintained but it is usually nothing more than a simple count. In other cases, static propagation of exceptions focused on code path may be traced, there is no evaluation of classes of exceptions.

SUMMARY OF THE INVENTION

An exception monitoring system, method, and program storage device for animating the visualization of program exceptions by executing an application program during a server session including a plurality of analysis windows; monitoring the application program for a thrown exception; responsive to the thrown exception, logging exception data to an exception table; responsive to conclusion of each analysis window, appending the exception table to a log file; and upon ending the server session, building an analysis database for rendering exception visualization animation to a user.

Other features and advantages of this invention will become apparent from the following detailed description of the presently preferred embodiment of the invention, taken in conjunction with the accompanying drawings.

DETAILED DESCRIPTION OF PREFERRED EMBODIMENTS

"In accordance with the preferred embodiment of the invention, an exception monitoring system and method is provided for visualizing historical exception data generated during execution of a software system that is capable of logging exception data in order to provide a big picture" perspective of the history of exception processes. An exception log is provided the contains at least the time that an exception occurred, a unique identifier of the type of exception, and an identification of the part of the code that threw the exception. Building on this log, an exception history is visualized based on run-time data which allows for "replay" of the exception history and therefore supports post-execution analysis, and evaluates a collection of exceptions, rather than examining the processing of a single exception, thus allowing for detection of patterns of exception behavior (e.g., sets of exceptions that occur together).

In an exemplary embodiment, the exception history is analyzed and then displayed in tabular form, starting with the earliest exception data. The display is then animated by moving forward in the history log, and updating the tabular display to show which exceptions have occurred during an analysis window. For example, the tabular display might move through the exception data in 10 minute increments. For each 10 minute interval, the tabular display would highlight any new exceptions generated. This display of exceptions can then be analyzed to identify areas of the code that should be examined further. For example, in the example presented hereafter, animation shows that the java.lang.ClassNotFoundException is occurring in most analysis intervals, and the total count of this exception is very high compared to the other exceptions. This behavior is either an outright error, or else a sign of unoptimized code (code that should not continually look for a class that does not exist). Each combination of exception type/exception source may be assigned in position in the table that never changes, in order to facilitate pattern detection.

Figure 1:
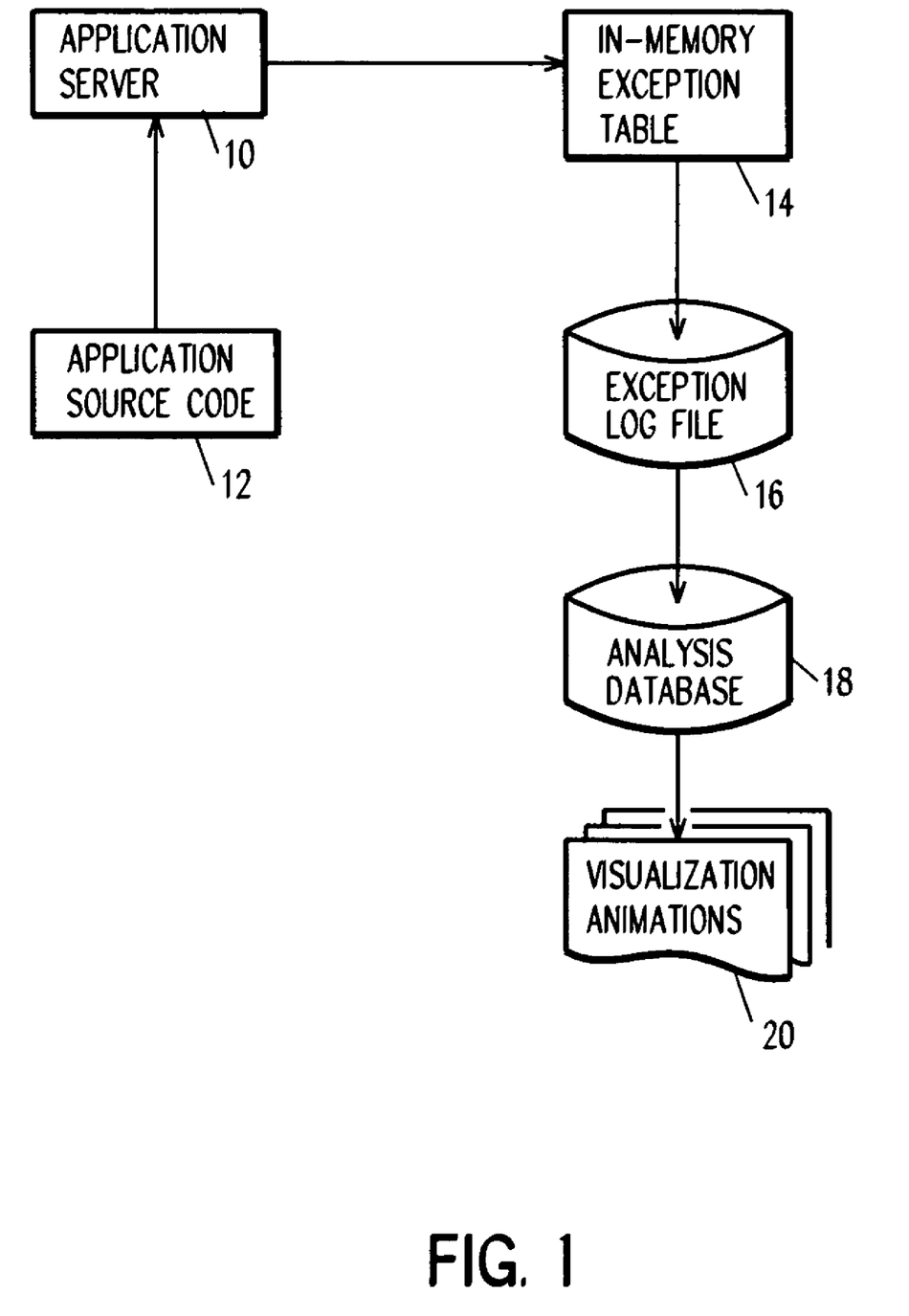
FIG. 1 is a high level system diagram illustrating the components of a preferred embodiment of the invention.

Referring to FIG. 1, application server 10 executes application code 12 and enters exceptions encountered in in-memory exception table 14. Periodically, table 14 contents are appended to an exception log file 16. For analysis, an analysis database 18 is built from log file 16 and a series of visualization animations 20 presented to the user.

Figure 2:
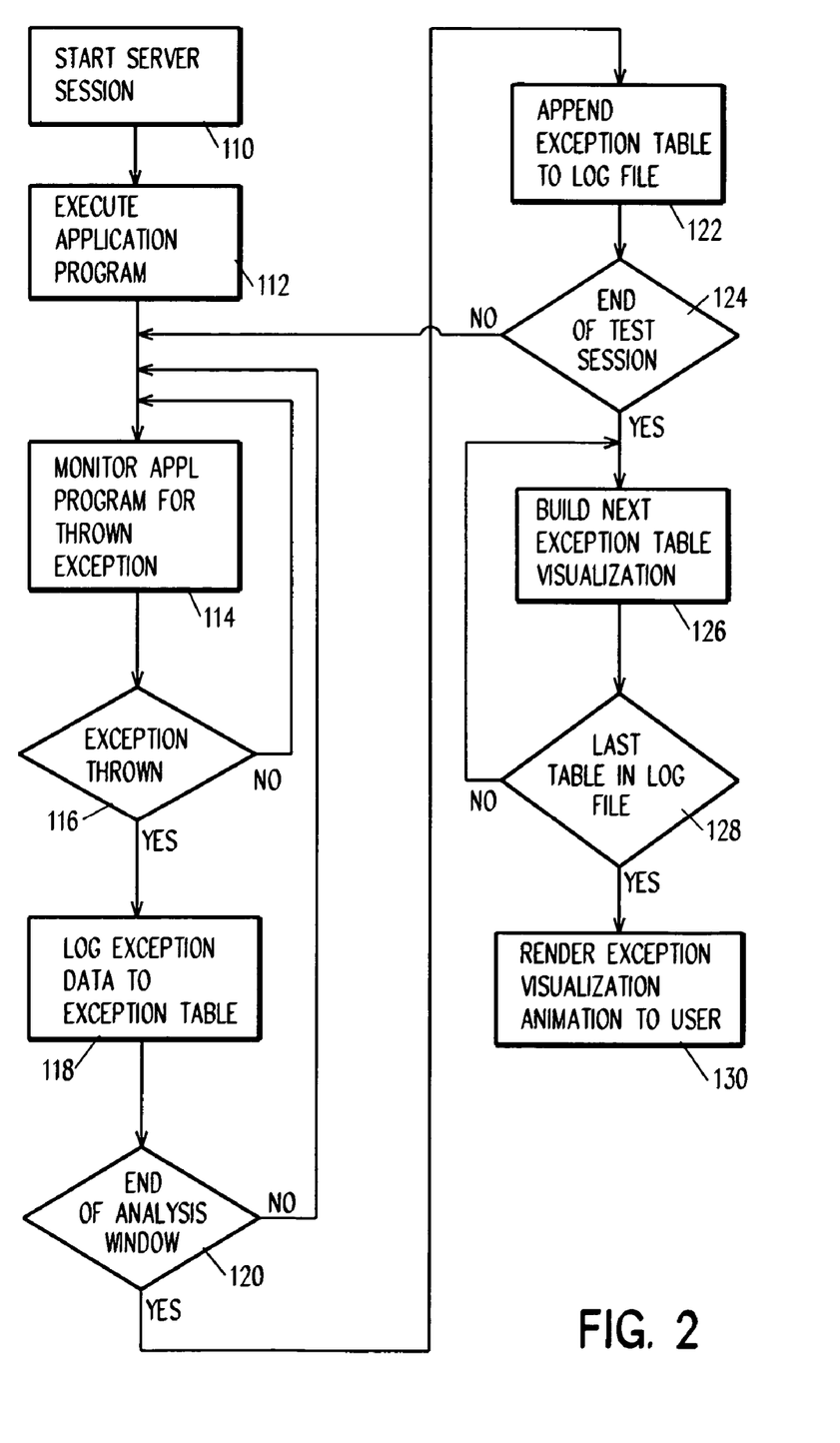
FIG. 2 is a flow chart illustrating the steps of the preferred embodiment of the process of the invention.

In operation, referring to FIG. 2, in step 110 an application server 10 session is started. In step 112, application program 12 is executed and, in step 114, monitored for exceptions. In steps 116, 118, if an exception is thrown by an application program 12 method or class, exception data is logged to in-memory exception table 14. This continues until, in step 120, the end of analysis window, say 10 minutes, is reached, whereupon in step 122 the contents of exception table 14 are appended to the end of exception log file 16. This process continues until, in step 124, the end of a test session and application program execution and exception monitoring ends. Thereupon, in steps 126, 128 each table 14 in log file 16 is added to analysis database 18 for building its visualization and in step 130 visualization animations rendered to the user.

Table 1 presents some Java code as an example of application source code 12 that illustrates exception throwing and catching.

TABLE 1

EXCEPTION THROWING AND CATCHING

```
// Define a new Exception class
class SampleException extends Exception {
    SampleException(String s) {
        super(s);
    }
}
// This class throws an exception when the method
    "testMethod" is called.
class TestException{
    void testMethod( ) throws SampleException {
        throw new SampleException("Example");
    }
}
// This class catches the exception thrown by testMethod
class Test {
    public static void main(String[ ] args){
        try {
            new TestException( ).testMethod( );
        }catch(SampleException e) {
            System.out.println(e.getMessage( ));
        }
    }
}
```

In the example of Table 1, it is possible to analyze exception propagation by analyzing the method calls in source code 12. For example, the method "testMethod" declares that it throws the exception "SampleException". Thus, it can be inferred that a SampleException would propagate from testMethod up to any caller of testMethod. This analysis of method calls and exceptions is referred to as "structural analysis" or "static analysis". Run-time analysis, on the other hand, is performed on a running software system. Structural analysis tells what might happen; run-time analysis looks at what actually happens. Prior art, for example Java compilers, exists for performing structural analysis of exception throwing.

However, this analysis of structure does not provide much information about what will happen when the program 12 executes. Although in the artificial example of Table 1 an example will be thrown on each call to testMethod, in reality exceptions are thrown at unpredictable times, usually in response to unusual conditions.

Insight into the behavior of a running program 12 is provided by keeping a record of which exceptions are thrown, when they are thrown, and from where. Analysis of the historical record of exceptions can aid understanding of the relative frequency of exceptions. Further, when examining the exception record across an entire system, potential patterns of exceptions can be detected that may lead to defects, or that might suggest ways of refactoring or restructuring the code 12 to make it more reliable or better performing.

In accordance with the preferred embodiment of the invention, an application server 10 keeps track of exception activity resulting from execution of code 12, and keeps it in an in-memory table 14. There is an entry in this table 14 for each unique combination of exception type and source line. For example, there would be two different entries in this table 14 for a java.lang.NullPointerException if it was thrown from two different parts of the program 12 under test.

Figure 3:
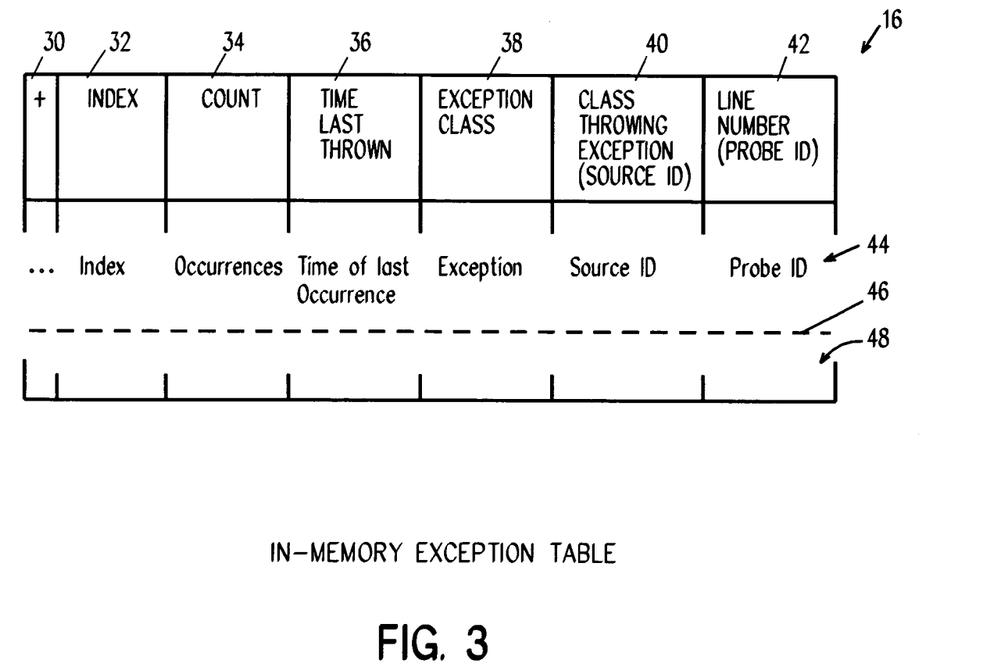
FIG. 3 is a diagram illustrating the format of the in-memory exception table of FIG. 1.
Figure 4:
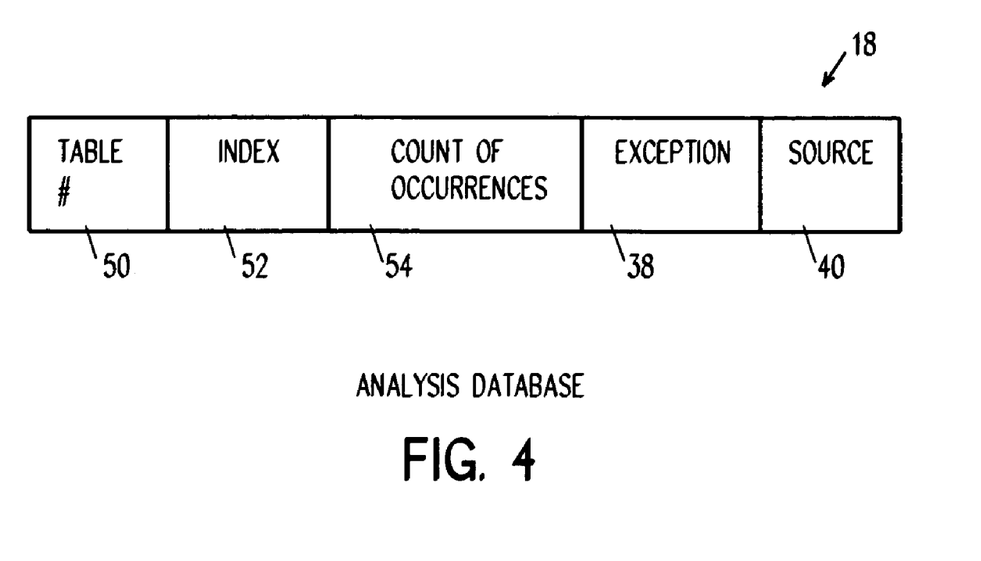
FIG. 4 is a diagram illustrating the format of the analysis database of FIG. 1.

Referring to FIG. 3, each entry in the in-memory exception activity table 14 contains the following information: index 32 and activity marker 30, count 34 of occurrences since server 10 start, time 36 when the exception was last thrown, exception class 38, class 40 that threw the exception, and line number 42 (the probe identifier within the class of code 12 that threw the exception).

In-memory table 14 is periodically appended to a file 16. The result of this appending is a history of all the transactions that have occurred within an instance of the application server 10 occasioned by code 12 since the server 10 was started. Table 2 is an example of such a file, and contains a sequence of exception tables 14, with the oldest tables at the beginning and the most recent table at the end. The example of Table 2 illustrates one such exception log 16; this excerpt contains two distinct dumps of the in-memory exception table 14.

TABLE 2

TRANSACTION HISTORY FILE EXAMPLE - LOG OF IN-MEMORY EXCEPTION TABLE DUMPS

| Index | Occurrences | Time of last Occurrence | Exception | SourceId | ProbeId |
|---|---|---|---|---|---|
| 1 | 1 | 03.11.06 09:47:10.922 EST | java.io.FileNotFoundException | com.ibm.ejs.jms.listener.AsyncMessageLog.readRequestLogFile | 128 |
| +2 | 1 | 03.11.06 09:47:10.922 EST | java.lang.ClassNotFoundException | com.ibm.ws.activity.ActivityServiceInterceptor.loadMigrationImpls | 424 |
| +3 | 1 | 03.11.06 09:47:15.391 EST | com.ibm.ws.naming.jcache.CacheEntryNotFoundException | com.ibm.ws.naming.util.WanInitCtxFactory.getInitialContextInternal | 367 |
| +4 | 1 | 03.11.06 09:47:16.062 EST | javax.naming.NameAlreadyBoundException | com.ibm.ws.naming.ipcos.WsnOptimizedNamingImpl.do_bind_new_corba_context | 1042 |
| +5 | 1 | 03.11.06 09:47:16.062 EST | javax.naming.NameAlreadyBoundException | com.ibm.ws.naming.jndicos.CNContextImpl.doCreateSubcontext | 2155 |
| +6 | 1 | 03.11.06 09:47:16.078 EST | javax.naming.nameAlreadyBoundException | com.ibm.ws.naming.jndicos.CNContextImpl.createSubcontext | 756 |
| +7 | 1 | 03.11.06 09:47:16.500 EST | org.omg.CosNaming.NamingContextPackage.NotFound | com.ibm.ws.naming.cosbase.WanOptimizedNamingImplBase.bind_new_corba_context | 944 |
| +8 | 1 | 03.11.06 09:47:16.500 EST | org.omg.CosNaming.NamingContextPackage.NotFound | com.ibm.ws.naming.jndicos.CNContextImpl.doCreateSubcontext | 2161 |
| +9 | 1 | 03.11.06 09:47:16.516 EST | javax.naming.NameNotFoundException | com.ibm.ws.naming.jndicos.CNContextImpl.createSubcontext | 756 |
| +10 | 1 | 03.11.06 09:47:17.312 EST | java.lang.NullPointerException | com.ibm.ws.utils.VUTrace.initialisation | 584 |
| +11 | 1 | 03.11.06 09:47:17.484 EST | javax.naming.NameNotFoundException | com.ibm.ws.naming.urlbase.UrlContext.lookup | 1226 |
| +12 | 1 | 03.11.06 09:47:17.500 EST | javax.naming.NameNotFoundException | com.ibm.ws.naming.urlbase.UrlContext.lookup | 1252 |
| +13 | 1 | 03.11.06 09:47:18.000 EST | java.io.FileNotFoundException | com.ibm.ejs.jms.DurableSubscriptionManagerImpl.readDurableSubscriptionFile | 236 |
| +14 | 1 | 03.11.06 09:47:24.906 EST | java.lang.ClassNotFoundException | com.ibm.ws.classloader.CompoundClassLoader.loadClass | 248 |
| +15 | 1 | 03.11.06 09:47:29.531 EST | org.omg.CosNaming.NamingContextPackage.AlreadyBound | com.ibm.ws.naming.cosbase.WsnOptimizedNamingImplBase.executeBatchedOperations | 1497 |
| +16 | 1 | 03.11.06 09:47:38.672 EST | com.ibm.mq.jms.BrokerCommandFailedException | com.ibm.ejs.jms.JMSTopicConnectionHandle.createDurableConnectionConsumer | 168 |
| +17 | 1 | 03.11.06 09:47:38.688 EST | com.ibm.mq.jms.BrokerCommandFailedException | com.ibm.ejs.jms.listener.MDBListenerImpl.internalStart | 281 |
| +18 | 1 | 03.11.06 09:47:38.703 EST | javax.jms.IllegalStateException | com.ibm.ejs.jms.JMSConnectionHandle.getExceptionListener | 250 |
| +19 | 1 | 03.11.06 09:47:38.703 EST | javax.jms.IllegalStateException | com.ibm.ejs.jms.listener.MDBListenerImpl.internalStop | 332 |
| +20 | 1 | 03.11.06 09:47:38.719 EST | javax.jms.IllegalStateException | com.ibm.ejs.jms.JMSConnectionHandle.close | 345 |
| +21 | 1 | 03.11.06 09:47:38.719 EST | javax.jms.IllegalStateException | com.ibm.ejs.jms.listener.MDBListenerImpl.internalStop | 372 |
| +22 | 1 | 03.11.06 09:47:38.734 EST | com.ibm.ejs.jms.listener.MDBRuntimeException | com.ibm.ejs.jms.listener.MsgListenerPort.add | 140 |
| 2 | 3 | 03.11.06 09:47:17.469 EST | javax.naming.NameNotFoundException | com.ibm.ejs.jms.DurableSubscriptionManagerImpl.readDurableSubscriptionFile | 236 |
| 3 | 2 | 03.11.06 09:47:18.000 EST | java.io.FileNotFoundException | com.ibm.ejs.jms.JMSTopicConnectionHandle.createDurableConnectionConsumer | 168 |
| 4 | 6 | 03.11.06 09:48:39.016 EST | com.ibm.mq.jms.BrokerCommandFailedException | com.ibm.ws.naming.util.WanInitCtxFactory.getInitialContextInternal | 367 |
| 5 | 1 | 03.11.06 09:47:36.406 EST | com.ibm.ws.naming.jcache.CacheEntryNotFoundException | com.ibm.ws.utils.VUTrace.initialisation | 584 |
| 6 | 1 | 03.11.06 09:47:17.312 EST | java.lang.NullPointerException | com.ibm.ejs.jms.listener.MDBListenerImpl.internalStop | 372 |
| 7 | 3 | 03.11.06 09:47:38.719 EST | javax.jms.IllegalStateException | com.ibm.ws.naming.jndicos.CNContextImpl.doCreateSubcontext | 2161 |
| 8 | 10 | 03.11.06 09:47:17.469 EST | org.omg.CosNaming.NamingContextPackage.NotFound | com.ibm.ws.naming.jndicos.CNContextImpl.doCreateSubcontext | 2155 |
| 9 | 1 | 03.11.06 09:47:16.750 EST | org.omg.CosNaming.NamingContextPackage.AlreadyBound | com.ibm.ejs.jms.listener.MsgListenerPort.add | 140 |
| 10 | 1 | 03.11.06 09:47:38.734 EST | com.ibm.ejs.jms.listener.MDBRuntimeException | com.ibm.ejs.jms.JMSConnectionHandle.getExceptionListener | 250 |
| 11 | 12 | 03.11.06 09:47:32.984 EST | javax.jms.IllegalStateException | com.ibm.ws.naming.ipcos.WsnOptimizedNamingImpl.do_bind_new_corba_context | 1042 |
| 12 | 1 | 03.11.06 09:47:10.922 EST | javax.naming.NameAlreadyBoundException | com.ibm.ws.activity.ActivityServiceInterceptor.loadMigrationImpls | 424 |
| 13 | 1 | 03.11.06 09:47:38.703 EST | java.lang.ClassNotFoundException | com.ibm.ejs.jms.listener.MDBListenerImpl.internalStop | 332 |
| 14 | 4 | 03.11.06 09:47:17.516 EST | javax.jms.IllegalStateException | com.ibm.ws.naming.urlbase.UrlContext.lookup | 1226 |
| 15 | 1 | 03.11.06 09:47:38.688 EST | javax.naming.NameNotFoundException | com.ibm.ejs.jms.listener.MDBListenerImpl.internalStart | 281 |
| 16 | 10 | 03.11.06 09:47:16.750 EST | com.ibm.mq.jms.BrokerCommandFailedException | com.ibm.ws.naming.jndicos.CNContextImpl.createSubcontext | 756 |
| 17 | 2 | 03.11.06 09:47:17.516 EST | javax.naming.NameNotFoundException | com.ibm.ws.naming.urlbase.UrlContext.lookup | 1252 |
| 18 | 3 | 03.11.06 09:47:17.469 EST | javax.naming.nameNotFoundException | com.ibm.ws.naming.cosbase.WanOptimizedNamingImplBase.bind_new_corba_context | 944 |
| 19 | 716 | 03.11.06 09:47:46.562 EST | org.omg.CosNaming.NamingContextPackage.NotFound | com.ibm.ws.classloader.CompoundClassLoader.loadClass | 248 |
| 20 | 2 | 03.11.06 09:47:32.984 EST | java.lang.ClassNotFoundException | com.ibm.ws.naming.cosbase.WanOptimizedNamingImplBase.executeBatchedOperations | 1497 |
| 21 | 1 | 03.11.06 09:47:38.719 EST | org.omg.CosNaming.NamingContextPackage.AlreadyBound | com.ibm.ejs.jms.JMSConnectionHandle.close | 345 |
| 22 | 1 | 03.11.06 09:47:10.047 EST | javax.jms.IllegalStateException | com.ibm.ejs.jms.listener.AsyncMessageLog.readRequestLogFile | 128 |
| +23 | 1 | 03.11.06 09:48:39.031 EST | java.io.FileNotFoundException | com.ibm.ejs.util.am._Alarm.run | 75 |

The format of each exception table within the log file is:
A two-line header 44
A line of hyphens 46
A list 48 of exception records, where the data values are separated by spaces Special cases in the list of exception records of Table 2 include the following. Exception records that are new since the last dump are printed out following a line of hyphens; and the index 32 for such records begins with a "+" sign 30.

Table 3 sets forth a pseudo-code statement for importing the exception log 16 of Table 2 into a database 18, such as a Notes view, for display and analysis. In this example implementation, a Lotus Notes database is used to store the log entries, but any other type of database is suitable.

TABLE 3

PROCESS FOR CONVERTING EXCEPTION LOG INTO ANALYSIS DATABASE

```
Pseudocode for main program
    Open the exception log
    Set table counter to 0
    For each exception table in the exception log
        Increment table counter
        ImportExceptionRecords(table counter)
    Close the exception log
```

TABLE 3-continued

PROCESS FOR CONVERTING EXCEPTION LOG INTO ANALYSIS DATABASE

```
Pseudocode for ImportExceptionRecords
    Read lines from the exception log until the word
    "index" is encountered
    Skip 2 lines
    Do the following until a blank line is encountered
        If the line begins with hyphen, continue
        If the line begins with a number (or with a +),
        then,
            Extract the index field from the line
            Extract the count field from the line
            Extract the timestamp field from the line
            Extract the exception field from the line
            Extract the source class field from the line
            Extract the line number field from the line
            Copy the above values into a new entry in a
            Notes database, add the table counter to the
            entry and save the entry
```

The resulting analysis database 18 of executing the process of Table 3 upon the two table dumps in log file 16 of Table 2 is illustrated in Table 4. Referring to FIG. 3, records in analysis database 18 of Table 4 include table number 50, index value 52, count 54 of exception occurrences, exception type 38, and source 40.

TABLE 4

TRANSACTION HISTORY FILE EXAMPLE - ANALYSIS DATABASE

| Ex Id | # | | Exception | Source |
|---|---|---|---|---|
| 1 | 1 | 1 | java.io.FileNotFoundException | com.ibm.ejs.jms.listener.AsyncMessageLog.readRequestLogFile |
| 1 | 2 | 1 | java.lang.ClassNotFoundException | com.ibm.ws.activity.ActivityServiceInterceptor.loadMigrationImpls |
| 1 | 3 | 1 | com.ibm.ws.naming.jcache.CacheEntryNotFoundException | com.ibm.ws.naming.util.WsnInitCtxFactory.getInitialContextInternal |
| 1 | 4 | 1 | javax.naming.NameAlreadyBoundException | com.ibm.ws.naming.ipcos.WsnOptimizedNamingImpl.do__bind__new__corba__context |
| 1 | 5 | 1 | org.omg.CosNaming.NamingContextPackage.AlreadyBound | com.ibm.ws.naming.jndicos.CNContextImpl.doCreateSubcontext |
| 1 | 6 | 1 | javax.naming.nameAlreadyBoundException | com.ibm.ws.naming.jndicos.CNContextImpl.createSubcontext |
| 1 | 7 | 1 | org.omg.CoaNaming.NamingContextPackage.NotFound | com.ibm.ws.naming.cosbase.WsnOptimizedNamingImplBase.bind__new__corba__context |
| 1 | 8 | 1 | org.omg.CosNaming.NamingContextPackage.NotFound | com.ibm.ws.naming.jndicos.CNContextImpl.doCreateSubcontext |
| 1 | 9 | 1 | javax.naming.NameNotFoundException | com.ibm.ws.naming.jndicos.CNContextImpl.createSubcontext |
| 1 | 10 | 1 | java.lang.NullPointerException | com.ibm.ws.utils.VUTrace.initialisation |
| 1 | 11 | 1 | javax.naming.NameNotFoundException | com.ibm.ws.naming.urlbase.UrlContext.lookup |
| 1 | 12 | 1 | javax.naming.NameNotFoundException | com.ibm.ws.naming.urlbase.UrlContext.lookup |
| 1 | 13 | 1 | java.io.FileNotFoundException | com.ibm.ejs.jms.DurableSubscriptionManagerImpl.readDurableSubscriptionFile |
| 1 | 14 | 1 | java.lang.ClassNotFoundException | com.ibm.ws.classloader.CompoundClassLoader.loadClass |
| 1 | 15 | 1 | org.omg.CosNaming.NamingContextPackage.AlreadyBound | com.ibm.ws.naming.cosbase.WsnOptimizedNamingImplBase.executeBatchedOperations |
| 1 | 16 | 1 | com.ibm.mq.jms.BrokerCommandFailedException | com.ibm.ejs.jms.JMSTopicConnectionHandle.createDurableConnectionConsumer |
| 1 | 17 | 1 | com.ibm.mq.jms.BrokerCommandFailedException | com.ibm.ejs.jms.listener.MDBListenerImpl.internalStart |
| 1 | 18 | 1 | javax.jms.IllegalStateException | com.ibm.ejs.jms.JMSConnectionHandle.getExceptionListener |
| 1 | 19 | 1 | javax.jms.IllegalStateException | com.ibm.ejs.jms.listener.MDBListenerImpl.internalStop |
| 1 | 20 | 1 | javax.jms.IllegalStateException | com.ibm.ejs.jms.JMSConnectionHandle.close |
| 1 | 21 | 1 | javax.jms.IllegalStateException | com.ibm.ejs.jms.listener.MDBListenerImpl.internalStop |
| 1 | 22 | 1 | com.ibm.ejs.jms.listener.MDBRunteimeException | com.ibm.ejs.jms.listener.MagListenerPort.add |
| 2 | 1 | 3 | javax.naming.NameNotFoundException | com.ibm.ws.naming.jndicos.CNContextImpl.createSubcontext |
| 2 | 2 | 1 | java.io.FileNotFoundException | com.ibm.ejs.jms.DurableSubscriptionManagerImpl.readDurableSubscriptionFile |
| 2 | 3 | 2 | com.ibm.mq.jms.BrokerCommandFailedException | com.ibm.ejs.jms.JMSTopicConnectionHandle.createDurableConnectionConsumer |
| 2 | 4 | 6 | com.ibm.ws.naming.jcache.CacheEntryNotFoundException | com.ibm.ws.naming.util.WsnInitCtxFactory.getInitialContextInternal |
| 2 | 5 | 1 | java.lang.NullPointerException | com.ibm.ws.utils.VUTrace.initialisation |
| 2 | 6 | 1 | javax.jms.IllegalStateException | com.ibm.ejs.jms.listener.MDBListenerImpl.internalStop |
| 2 | 7 | 3 | org.omg.CosNaming.NamingContextPackage.NotFound | com.ibm.ws.naming.jndicos.CNContextImpl.doCreateSubcontext |
| 2 | 8 | 10 | org.omg.CosNaming.NamingContextPackage.AlreadyBound | com.ibm.ws.naming.jndicos.CNContextImpl.doCreateSubcontext |
| 2 | 9 | 1 | com.ibm.ejs.jms.listener.MDBRuntimeException | com.ibm.ejs.jms.listener.MsgListenerPort.add |

TABLE 4-continued

TRANSACTION HISTORY FILE EXAMPLE - ANALYSIS DATABASE

| Ex Id | # | Exception | Source |
|---|---|---|---|
| 2 | 10 | 1 javax.jms.IllegalStateException | com.ibm.ejs.jms.JMSConnectionHandle.getExceptionListener |
| 2 | 11 | 12 javax.naming.NameAlreadyBoundException | com.ibm.ws.naming.ipcos.WsnOptimizedNamingImpl.do__bind__new__corba__context |
| 2 | 12 | 1 java.lang.ClassNotFoundException | com.ibm.ws.activity.ActivityServiceInterceptor.loadMigrationImpls |
| 2 | 13 | 1 javax.jms.IllegalStateException | com.ibm.ejs.jms.listener.MDBListenerImpl.internalStop |
| 2 | 14 | 4 javax.naming.NameNotFoundException | com.ibm.ws.naming.urlbase.UrlContext.lookup |
| 2 | 15 | 1 com.ibm.mq.jms.BrokerCommandFailedException | com.ibm.ejs.jms.listener.MDBListenerImpl.internalStart |
| 2 | 16 | 10 javax.naming.NameAlreadyBoundException | com.ibm.ws.naming.jndicos.CNContextImpl.createSubcontext |
| 2 | 17 | 2 javax.naming.nameNotFoundException | com.ibm.ws.naming.urlbase.UrlContext.lookup |
| 2 | 18 | 3 org.omg.CosNaming.NamingContextPackage.NotFound | com.ibm.ws.naming.cosbase.WanOptimizedNamingImplBase.bind__new__corba__context |
| 2 | 19 | 716 java.lang.ClassNotFoundException | com.ibm.ws.classloader.CompoundClassLoader.loadClass |
| 2 | 20 | 2 org.omg.CosNaming.NamingContextPackage.AlreadyBound | com.ibm.ws.naming.cosbase.WanOptimizedNamingImplBase.executeBatchedOperations |
| 2 | 21 | 1 javax.jms.IllegalStateException | com.ibm.ejs.jms.JMSConnectionHandle.close |
| 2 | 22 | 1 java.io.FileNotFoundException | com.ibm.ejs.jms.listener.AsyncMessageLog.readRequestLogFile |
| 2 | 23 | 1 com.ibm.ejs.jms.listener.MDBRuntimeException | com.ibm.ejs.util.am.__Alarm.run |

Figure 5:
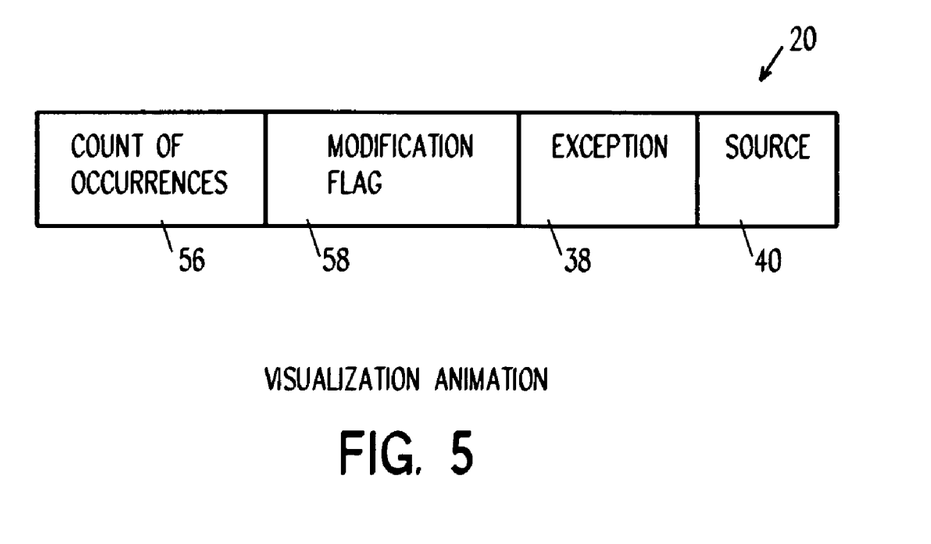
FIG. 5 is a diagram illustrating the format of the visualization animations of FIG. 1.

Once the raw exception data has been stored in a Notes database 18 (as in Table 4), it is then possible to create animations of the data to show how exceptions vary over time. For example, one possible animation 20 displays each exception table dump in sequence, with highlights to show which exceptions are new. So, using the example of Table 4, there are two different exception tables, each having the format of FIG. 5, including count of occurrences 56, modification flag 58, exception 38 and source 40. The animation will therefore display two frames of information, as in Tables 5 and 6, with each frame corresponding to an instance of an exception table 14. In the embodiment of Tables 5 and 6, an arrow → 58 appears to the left of any exception that had activity (that is, it is either a new exception or its count increased).

Table 5 illustrates the first frame of animation 20, and Table 6 the second frame of animation 20.

TABLE 5

EXCEPTION LOG ANIMATION FRAME 1

| # | Exception | Source |
|---|---|---|
| 1 | → java.io.FileNotFoundException | com.ibm.ejs.jms.listener.AsyncMessageLog.readRequestLogFile |
| 1 | → java.lang.ClassNotFoundException | com.ibm.ws.activity.ActivityServiceInterceptor.loadMigrationImpls |
| 1 | → com.ibm.ws.naming.jcache.CacheEntryNotFoundException | com.ibm.ws.naming.util.WanInitCtxFactory.getInitialContextInternal |
| 1 | → javax.naming.NameAlreadyBoundException | com.ibm.ws.naming.ipcos.WsnOptimizedNamingImpl.do__bind__new__corba__context |
| 1 | → org.omg.CosNaming.NamingContextPackage.AlreadyBound | com.ibm.ws.naming.jndicos.CNContextImpl.doCreateSubcontext |
| 1 | → javax.naming.nameAlreadyBoundException | com.ibm.ws.naming.jndicos.CNContextImpl.createSubcontext |
| 1 | → org.omg.CoaNaming.NamingContextPackage.NotFound | com.ibm.ws.naming.cosbase.WanOptimizedNamingImplBase.bind__new__corba__context |
| 1 | → org.omg.CosNaming.NamingContextPackage.NotFound | com.ibm.ws.naming.jndicos.CNContextImpl.doCreateSubcontext |
| 1 | → javax.naming.NameNotFoundException | com.ibm.ws.naming.jndicos.CNContextImpl.createSubcontext |
| 1 | → java.lang.NullPointerException | com.ibm.ws.utils.VUTrace.initialisation |
| 1 | → javax.naming.NameNotFoundException | com.ibm.ws.naming.urlbase.UrlContext.lookup |
| 1 | → javax.naming.NameNotFoundException | com.ibm.ws.naming.urlbase.UrlContext.lookup |
| 1 | → java.io.FileNotFoundException | com.ibm.ejs.jms.DurableSubscriptionManagerImpl.readDurableSubscriptionFile |
| 1 | → java.lang.ClassNotFoundException | com.ibm.ws.classloader.CompoundClassLoader.loadClass |
| 1 | → org.omg.CosNaming.NamingContextPackage.AlreadyBound | com.ibm.ws.naming.cosbase.WsnOptimizedNamingImplBase.executeBatchedOperations |
| 1 | → com.ibm.mq.jms.BrokerCommandFailedException | com.ibm.ejs.jms.JMSTopicConnectionHandle.createDurableConnectionConsumer |
| 1 | → com.ibm.mq.jms.BrokerCommandFailedException | com.ibm.ejs.jms.listener.MDBListenerImpl.internalStart |
| 1 | → javax.jms.IllegalStateException | com.ibm.ejs.jms.JMSConnectionHandle.getExceptionListener |
| 1 | → javax.jms.IllegalStateException | com.ibm.ejs.jms.listener.MDBListenerImpl.internalStop |
| 1 | → javax.jms.IllegalStateException | com.ibm.ejs.jms.JMSConnectionHandle.close |
| 1 | → javax.jms.IllegalStateException | com.ibm.ejs.jms.listener.MDBListenerImpl.internalStop |
| 1 | → com.ibm.ejs.jms.listener.MDBRunteimeException | com.ibm.ejs.jms.listener.MagListenerPort.add |

TABLE 6

EXCEPTION LOG ANIMATION FRAME 2

| # | Exception | Source |
|---|---|---|
| 1 | java.io.FileNotFoundException | com.ibm.ejs.jms.listener.AsyncMessageLog.readRequestLogFile |
| 1 | java.lang.ClassNotFoundException | com.ibm.ws.activity.ActivityServiceInterceptor.loadMigrationImpls |
| 6 | → com.ibm.ws.naming.jcache.CacheEntryNotFoundException | com.ibm.ws.naming.util.WanInitCtxFactory.getInitialContextInternal |
| 12 | → javax.naming.NameAlreadyBoundException | com.ibm.ws.naming.ipcos.WsnOptimizedNamingImpl.do__bind__new__corba__context |
| 10 | → org.omg.CosNaming.NamingContextPackage.AlreadyBound | com.ibm.ws.naming.jndicos.CNContextImpl.doCreateSubcontext |
| 10 | → javax.naming.nameAlreadyBoundException | com.ibm.ws.naming.jndicos.CNContextImpi.createSubcontext |
| 3 | → org.omg.CoaNaming.NamingContextPackage.NotFound | com.ibm.ws.naming.cosbase.WanOptimizedNamingImplBase.bind__new__corba__context |
| 3 | → org.omg.CosNaming.NamingContextPackage.NotFound | com.ibm.ws.naming.jndicos.CNContextImpl.doCreateSubcontext |
| 3 | → javax.naming.NameNotFoundException | com.ibm.ws.naming.jndicos.CNContextImpl.createSubcontext |
| 1 | java.lang.NullPointerException | com.ibm.ws.utils.VUTrace.initialisation |
| 4 | → javax.naming.NameNotFoundException | com.ibm.ws.naming.urlbase.UrlContext.lookup |
| 2 | → javax.naming.NameNotFoundException | com.ibm.ws.naming.urlbase.urlContext.lookup |
| 1 | java.io.FileNotFoundException | com.ibm.ejs.jms.DurableSubscriptionManagerImpl.readDurableSubscriptionFile |
| 716 | → java.lang.ClassNotFoundException | com.ibm.ws.classloader.CompoundClassLoader.loadClass |
| 2 | → org.omg.CosNaming.NamingContextPackage.AlreadyBound | com.ibm.ws.naming.cosbase.WsnOptimizedNamingImplBase.executeBatchedOperations |
| 2 | → com.ibm.mq.jms.BrokerCommandFailedException | com.ibm.ejs.jms.JMSTopicConnectionHandle.createDurableConnectionConsumer |
| 1 | com.ibm.mq.jms.BrokerCommendFailedException | com.ibm.ejs.jms.listener.MDBListenerImpl.internalStart |
| 1 | javax.jms.IllegalStateException | com.ibm.ejs.jms.JMSConnectionHandle.getExceptionListener |
| 1 | javax.jms.IllegalStateException | com.ibm.ejs.jms.listener.MDBListenerImpl.internalStop |
| 1 | javax.jms.IllegalStateException | com.ibm.ejs.jms.JMSConnectionHandle.close |
| 1 | javax.jms.IllegalStateException | com.ibm.ejs.jms.listener.MDBListenerImpl.internalStop |
| 1 | com.ibm.ejs.jms.listener.MDBRuntimeException | com.ibm.ejs.jms.listener.MagListenerPort.add |
| 1 | → com.ibm.ejs.jms.listener.MDBRuntimeException | com.ibm.ejs.util.am.__Alarm.run |

Since Table 5 represents the first set of exceptions, all of the exceptions are new and all of them are marked with an arrow → (modification flag 58).

In the log animation frame of Table 6, arrows → 58 are placed next to a number of exceptions whose counts have increased between dumps. At the bottom of Table 6 there is one new exception (the MDBRuntimeException having been thrown from a new module com.ibm.ejs.util.am.__Alarm.run).

To make detection of patterns easier, the displays of Table 5 and 6 are organized so that new exceptions are added at the bottom, and the relative position of older exceptions does not change from frame to frame 20. This display pattern is provided by the process of Table 7.

TABLE 7

PROCESS FOR DISPLAYING ANIMATED EXCEPTION LOG

For each exception dump in the database
   Read all exceptions for this dump
   If this is the first dump, then
      Mark all exceptions as modified
   Else
      for each exception in the dump
         Compare to previous instance of exception
         If this is a new exception, then mark it as "modified"
         If the exception count has changed, then mark it as "modified"
   End if
   Display exception list, adding arrow next to any "modified" entry
Continue to next dump The example of Tables 5 and 6 shows a simple animation of a sequence of tables 14, with changed entries being marked with an arrow 58. Other various are clearly possible, including the use of color to show the rows where there is current activity, or mapping a range of colors to exception counts (so that high counts show red while low counts show green, for example). Instead of a table, a bar chart can be used.

Figure 6:
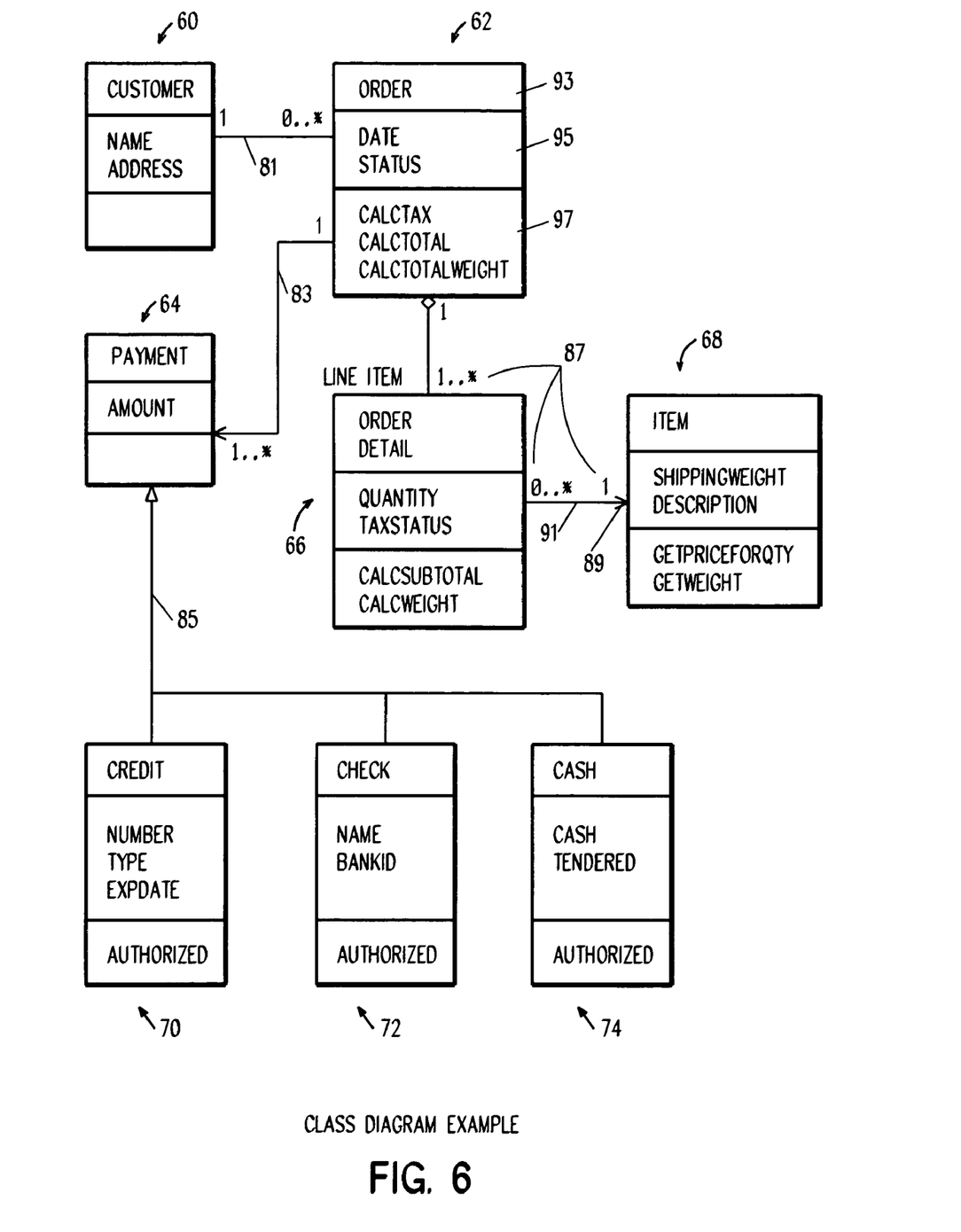
FIG. 6 is a class diagram example of an alternative visualization animation example.

Referring to FIG. 6, it is also possible to map exception information into a graphical representation of program structure, since each exception includes information about the class from which the exception originated. The Unified Modeling Language (UML) is a way of diagramming program structure.

FIG. 6 illustrates an example UML class diagram that shows a set of classes 60, 62, 64, 66, 68, 70, 72, and 74 and the relationships 81, 83, 85, 91 between them. A typical class box 62 includes class name 93, attributes 95, and operations or processes 97. Payment class 64 is an example of an abstract class. Associations between classes are illustrated by lines 81, 83, 91, generalizations by line 85, multiplicity by items 87, navigatability by elements 89.

An exception history can be "played back" onto such a class diagram in much the same way it is played back in a sequence of tables 20. The animation of such a diagram may be accomplished using the same pseudo code as in Table 7, but by altering the display logic to change the color, for example, of a class 60, . . . ,74 from which an exception was generated. Other visualizations are possible, such as displaying counts of exceptions next to the class box 60, displaying a histogram of exceptions next to a class box for those classes that are throwing more than one exception, or mapping the color of the class box into a range of exception counts (so that the shadings of the classes change as the exception counts rise).

ADVANTAGES OVER THE PRIOR ART

It is an advantage of the preferred embodiments of the invention that there is provided a system and method for visualizing animations of classes of exceptions thrown during execution of application code.

ALTERNATIVE EMBODIMENTS

Figure 7:
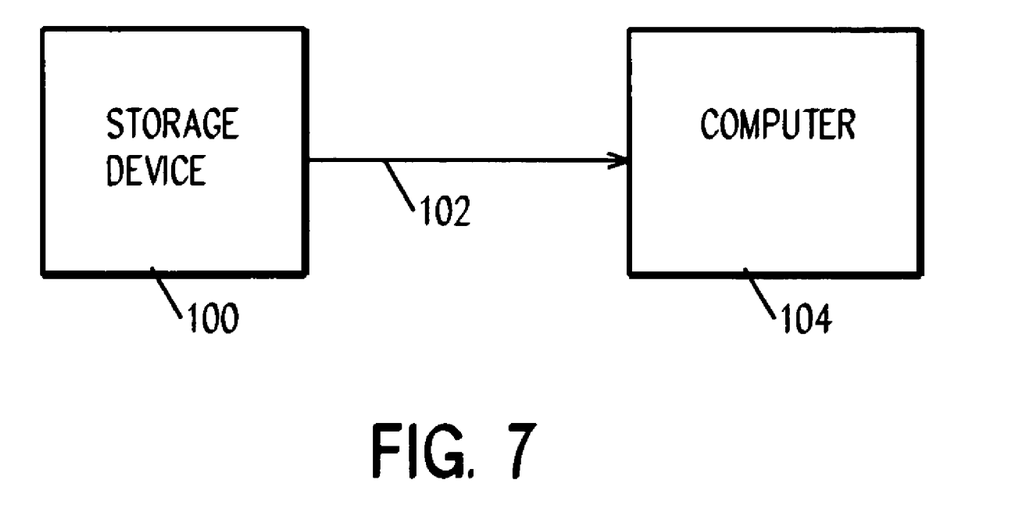
FIG. 7 is a high level representation of a program storage device for controlling the operation of a computer according to the preferred embodiments of the invention.

It will be appreciated that, although specific embodiments of the invention have been described herein for purposes of illustration, various modifications may be made without departing from the spirit and scope of the invention. Referring to FIG. 7, in particular, it is within the scope of the invention to provide a computer program product or program element, or a program storage or memory device such as a solid or fluid transmission medium 102, magnetic or optical wire, tape or disc 100, or the like, for storing signals readable by a machine, for controlling the operation of a computer 104 according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

I claim:

1. A method of graphically animating program exceptions, comprising:
    executing an application program during a server session including a plurality of analysis windows;
    monitoring, on an exception monitoring system, said application program for a thrown exception;
    responsive to said thrown exception, logging, by the exception monitoring system, exception data to an exception table;
    responsive to conclusion of each analysis window, appending, by the exception monitoring system, said exception table to a log file;
    upon ending said server session, building, by the exception monitoring system, an analysis database for rendering an exception visualization animation to a user,
        wherein said exception visualization animation maps exception information into a graphical representation of a program structure; and
        wherein said thrown exception includes information about a class from which said thrown exception originated.

2. The method of claim 1, said exception data comprising an index value, a count of number of exception instances, a time of last throw of said exception instance, exception class indicia, exception source indicia, and probe identifier.

3. The method of claim 2, said analysis database including for each table a plurality of rows of exception data, with a row for each unique exception-source tuple including table number, index indicia, count of occurrences, exception indicia, and source of exception indicia.

4. The method of claim 3, said visualization animation including a plurality of exception renditions corresponding to said exception tables, each exception rendition including indicia representative of the number of occurrences of said exception, a modification flag, said exception indicia and said source of exception indicia.

5. The method of claim 4, said modification flag being set for each exception-source tuple of an exception table having exception activity during an analysis window corresponding to said exception table, said activity including one or more of: a new exception and an exception having its count increased.

6. The method of claim 5, said visualization animation comprising a sequence of table renditions.

7. The method of claim 5, said visualization animation comprising a sequence of universal modeling language (UML) class diagrams.

8. A system for graphically animating exceptions thrown by an application, comprising:
    a processor;
    an application server;
    an application program;
    an in-memory exception table;
    an exception log file;
    an analysis database; and
    a user interface;
    said application server for executing said application program during a server session including a plurality of analysis windows;
    responsive to exceptions thrown by said application program during execution for logging exception data to said in-memory exception table;
    responsive to completing an analysis window, logging said exception table to said exception log file;
    responsive to completing said server session, for building an analysis database from said exception log file;
    generating from said exception log file an exception visualization animation including a sequential plurality of exception table renditions to said user interface, wherein said exception visualization animation maps exception information into a graphical representation of a program structure; and
    wherein said exceptions include information about a class from which one or more of said exceptions originated.

9. The system of claim 8, said exception data comprising an index value, a count of number of exception instances, a time of last throw of said exception instance, exception class indicia, exception source indicia, and probe identifier.

10. The system of claim 9, said analysis database including for each table a plurality of rows of exception data, with a row for each unique exception-source tuple including table number, index indicia, count of occurrences, exception indicia, and source of exception indicia.

11. The system of claim 10, said visualization animation including a plurality of exception renditions corresponding to said exception tables, each exception rendition including indicia representative of the number of occurrences of said exception, a modification flag, said exception indicia and said source of exception indicia.

12. The system of claim 11, said modification flag being set for each exception-source tuple of an exception table having exception activity during an analysis window corresponding to said exception table, said activity including either one or more of a new exception and an exception having its count increased.

13. The system of claim 12, said visualization animation comprising a sequence of table renditions.

14. The system of claim 12, said visualization animation comprising a sequence of universal modeling language (UML) class diagrams.

15. A program storage device readable by a machine, tangibly embodying a program of instructions executable by a machine to perform operations for graphically animating program exceptions, said operations comprising:
    executing an application program during a server session including a plurality of analysis windows;
    monitoring said application program for a thrown exception;

responsive to said thrown exception, logging exception data to an exception table;

responsive to conclusion of each analysis window, appending said exception table to a log file; and upon ending said server session, building an analysis database for rendering exception visualization animation to a user, wherein said exception visualization animation maps exception information into a graphical representation of a program structure; and wherein said thrown exception includes information about a class from which said thrown exception originated.

16. The program storage device of claim 15, said exception data comprising an index value, a count of number of exception instances, a time of last throw of said exception instance, exception class indicia, exception source indicia, and probe identifier.

17. The program storage device of claim 16, said analysis database including for each table a plurality of rows of exception data, with a row for each unique exception-source tuple including table number, index indicia, count of occurrences, exception indicia, and source of exception indicia.

18. The program storage device of claim 17, said visualization animation including a plurality of exception renditions corresponding to said exception tables, each exception rendition including indicia representative of the number of occurrences of said exception, a modification flag, said exception indicia and said source of exception indicia.

19. The program storage device of claim 18, said modification flag being set for each exception-source tuple of an exception table having exception activity during an analysis window corresponding to said exception table, said activity including one or more of a new exception and an exception having its count increased.

20. The program storage device of claim 19, said visualization animation comprising a sequence of table renditions.

21. The program storage device of claim 19, said visualization animation comprising a sequence of universal modeling language (UML) class diagrams.

* * * * *

UNITED STATES PATENT AND TRADEMARK OFFICE
CERTIFICATE OF CORRECTION

PATENT NO. : 7,627,857 B2  Page 1 of 1
APPLICATION NO. : 10/988924
DATED : December 1, 2009
INVENTOR(S) : Vaughn Theodore Rokosz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1416 days.

Signed and Sealed this

Second Day of November, 2010

David J. Kappos
*Director of the United States Patent and Trademark Office*